United States Patent [19]

Riggins

[11] 4,091,601
[45] May 30, 1978

[54] WORK TABLE

[76] Inventor: James L. Riggins, Star Route, Mintonville, Casey County, Ky. 42542

[21] Appl. No.: 707,646

[22] Filed: Jul. 22, 1976

[51] Int. Cl.² .................. A01D 39/00; B65B 13/08; B24B 1/10; B60P 1/28
[52] U.S. Cl. ........................... 53/390; 56/27.5; 56/480; 100/34; 214/5.5; 294/5.5; 298/4; 298/17.7
[58] Field of Search .............. 53/390, 198 R, 135, 53/219; 93/93 R; 248/128, 138; 269/55; 214/5.5, 130 A; 294/5.5; 56/27.5, 480, 476, 474, 191, 166, 84, 89, DIG. 9, 131; 100/34; 298/4, 17.6, 17.7

[56] References Cited

U.S. PATENT DOCUMENTS

| 83,721 | 11/1868 | Moore | 298/4 |
|---|---|---|---|
| 1,027,355 | 5/1912 | Norris | 53/198 R |
| 1,452,198 | 4/1923 | Hancock | 298/17.6 X |
| 1,629,422 | 5/1927 | Trulove | 214/5.5 |
| 1,832,410 | 11/1931 | Myers | 53/390 |
| 1,933,689 | 11/1933 | Wirz | 298/17.7 |
| 2,364,518 | 12/1944 | Clouser | 100/34 |
| 2,404,205 | 7/1946 | Ammon | 100/34 |
| 2,818,180 | 12/1957 | Keene | 100/34 X |
| 2,827,324 | 3/1958 | Royal | 294/5.5 |
| 3,107,792 | 10/1963 | Mish, Jr. | 214/5.5 |
| 3,211,300 | 10/1965 | Woolard | 214/5.5 |
| 3,430,555 | 3/1969 | De Bruhl | 100/34 |
| 3,459,120 | 8/1969 | Brunette | 100/34 |
| 3,848,395 | 11/1974 | Totten | 53/390 X |

Primary Examiner—Othell M. Simpson
Assistant Examiner—Horace M. Culver
Attorney, Agent, or Firm—A. J. Castorina

[57] ABSTRACT

A work table designed to be used to facilitate the removal of objects, preferably tobacco stalks, supported on sticks or other elongated elements by single or by several workers.

3 Claims, 4 Drawing Figures

WORK TABLE

BACKGROUND OF THE INVENTION

Work tables of various shapes and sizes have been utilized by workers since the beginning of time to aid them in making their respective jobs easier and quicker. Work tables are used daily and some examples of the same are mechanics work benches, desks, ironing boards, drafting boards, etc.

SUMMARY OF THE INVENTION

The present invention relates to a work table and is designed to be used specifically for removing objects from an elongated support such as a stick and preferably tobacco stalks which are hung on sticks to dry. The table is so designed that it can be used by a single operator or by a plurality of workers as the case may be, and consists of a base support, a work surface pivotally connected thereto, and article removing means positioned on and extending upwardly from the work surface.

BRIEF DESCRIPTION OF THE DRAWINGS

The invention will be described with reference to the accompanying drawings wherein.

DESCRIPTION OF THE PREFERRED EMBODIMENT

Figure 1:
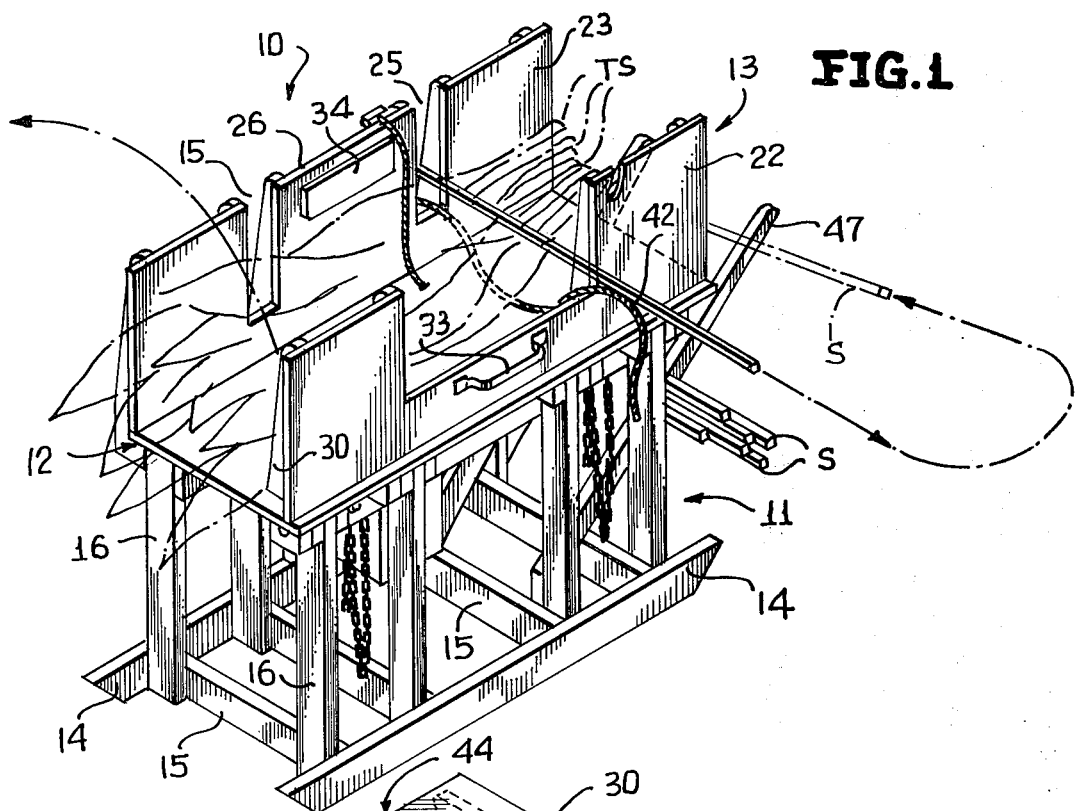
FIG. 1 is a perspective view of the work table of the present invention.
Figure 2:
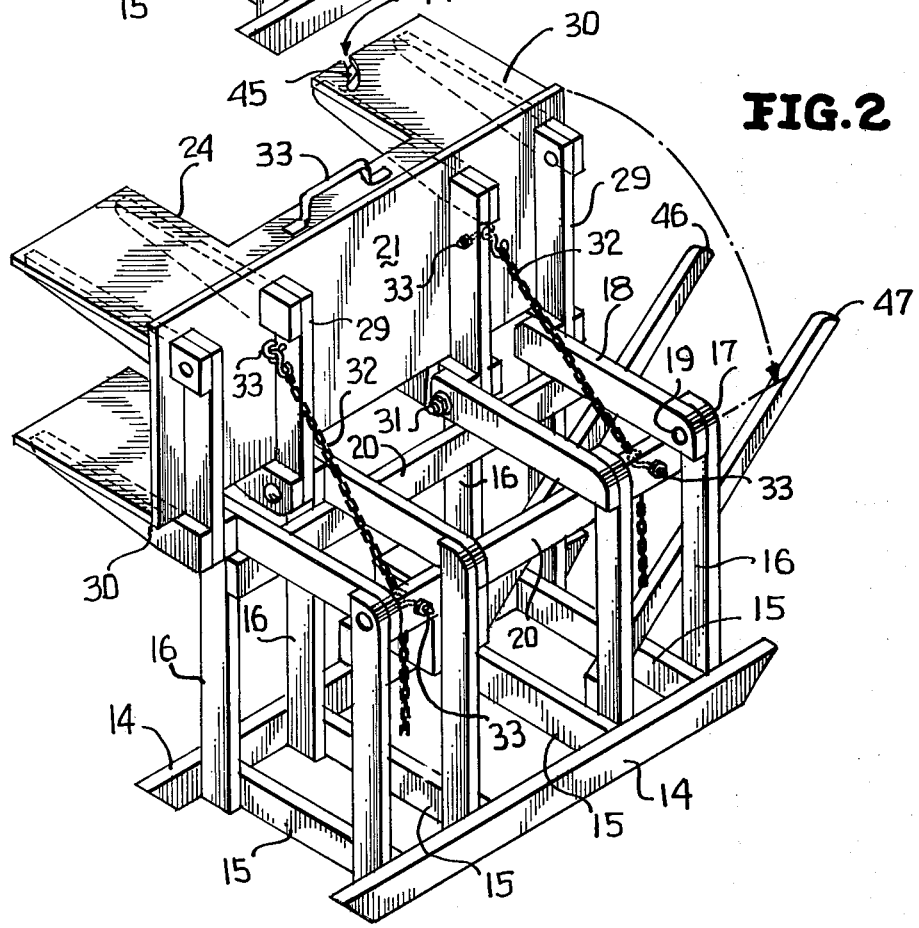
FIG. 2 is a perspective view showing the work surface of the table tilted to a dumping position.

With reference to FIG. 1, the work table of the present invention is designated generally by the numeral 10 and consists of a base 11, a work surface 12 and article engaging members 13 extending upwardly from the work surface 12. The base 11 is comprised of two spaced skids 14, 14 having cross bars 15 disposed therebetween for rigidifying the same. Pairs of upright members 16, 16 extend upwardly from the juncture of the cross bars 15 and the skids 14 and each is provided with an opening 17 in the upstanding end. Upper cross bars 18, as seen in FIG. 2, are disposed parallel to the lower cross bars 15 and connect the free ends of the spaced upright members 16 to form a box-like frame. Each end of the upper cross bars 18 are provided with openings 19 which align with the openings 17 of the upright members 16, for reasons to become apparent. A pair of spaced beams 20, 20 are disposed substantially parallel to the skids 14, 14 and are secured at the juncture of the upright members 16 and the cross bars 18 to reinforce the same. It is therefore apparent that the skids 14, 14 upstanding members 16, upper and lower cross bars 15 and 16, and reinforcing beams 20 form the solid and sturdy rectangular base 11 to which the work surface 12 is secured.

With continuing reference to FIGS. 1 and 2, the work surface 12 is comprised of a planar rectangular base 21 having front and rear vertical walls 22, 23 positioned along the long sides of the planar base 21. The front wall 22 is provided with a rectangular cut out 24 and the rear wall 23 with two spaced slots 25, 25, with a solid intermediate panel 26 therebetween. The lower edge 27 of the cutout 24 and the lower edges 28, 28 of the cutouts 25, 25 are in the same plane for reasons that will become apparent. The base 21 is secured to spaced cross bars 29 which are of the same general length as the upper cross bars 18 and are disposed therebeside when the base 21 is resting thereon. The walls 22, 23 are secured to the base 21 by spaced vertical members 30 having their lower ends aligned with and secured to the cross bars 29.

Figure 4:
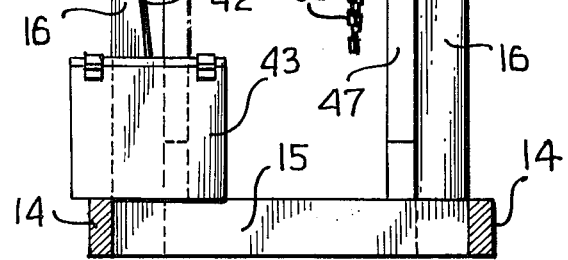
FIG. 4 is a sectional view taken on line 4—4 of FIG. 3 showing the tilting features of the work surface in phantom outline.

The work surface 21 is provided with means for tilting the same forwardly or rearwardly with respect to the base 11. FIG. 2 depicts the work surface tilted rearwardly while FIG. 4 shows the same in its normal position in solid lines and in its tilting position in phantom lines. The rearward tilting is accomplished by providing bolts 31 through aligned openings in the ends of the centralmost upright members 16, 16, the upper cross bars 18, 18, work surface cross bars 29, 29 and rear vertical wall supports 30, 30.

Forward tilting of the work surface 21 is accomplished by removing the pivot bolt means 31 from the aforementioned aligned openings and placing them in aligned openings provided in the outermost upright members 16, 16, cross bars 18, 18, cross bars 29, 29 and front vertical wall support 30, 30.

The tilting of the work surface 21 is limited by a pair of spaced chains 32, 32 having their respective ends connected to eye-bolts 33, secured to the beam 20 and cross bars 29, and the same is depicted in FIG. 2. To tilt the work surface in the other direction the chains are repositioned to be connected to the other cross beam 20 and the outermost cross bars 29, 29. For the purposes of clarity, the same has been omitted. A handle 33 is provided on the front wall 22 and is grasped to tilt the surface 21 in either of the directions.

In conclusion, it is obvious that the tilting in either of the aforementioned directions is accomplished by the positioning of the bolt means 31 in their proper openings.

Figure 3:
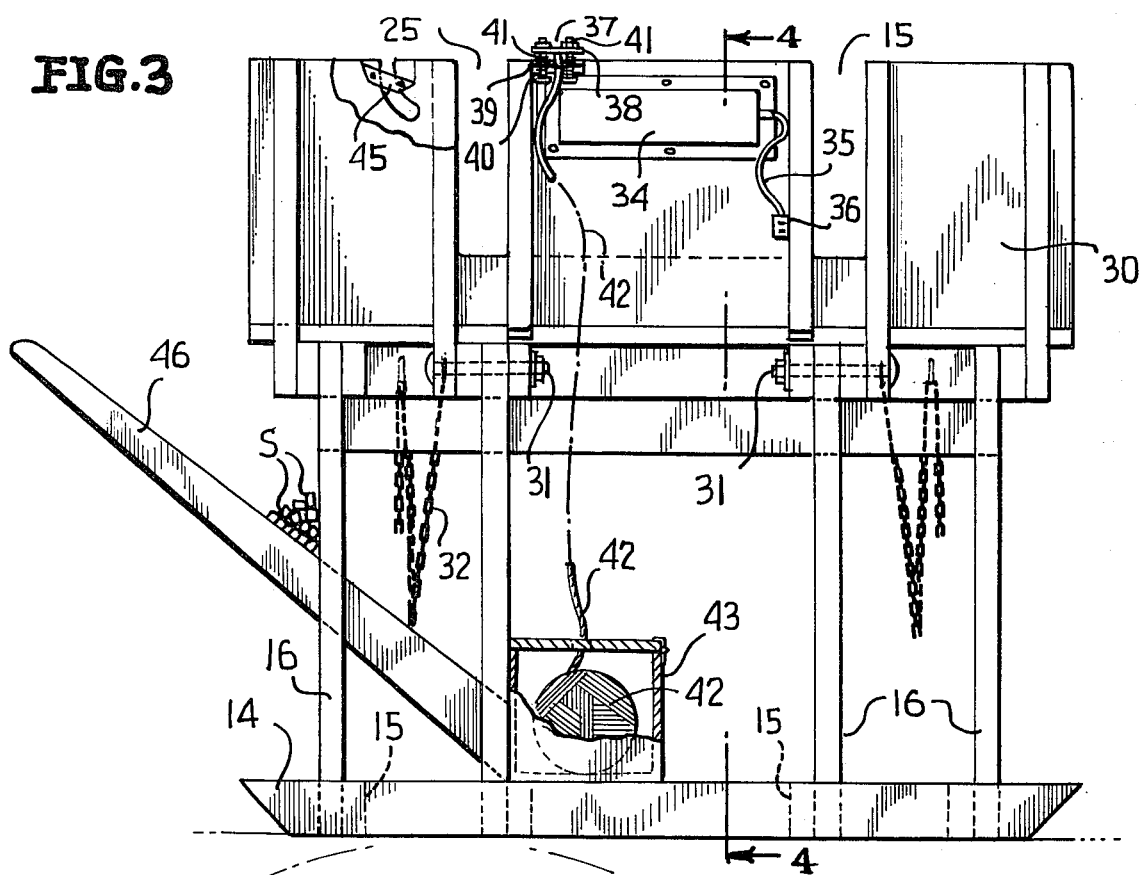
FIG. 3 is a rear elevational view of the work table.

The table 10 is further provided with other accessories to be used in conjunction therewith and as seen in FIGS. 1 and 3, the center panel 26 of the rear vertical wall 23 is provided with a light 34 having its lead 35 extending to an outlet 36 adapted to be connected to a source of electricity. The panel 26 is further provided with a string holding member 37 comprised of a pair of spaced plates 38, 39 biased towards one another by spring and bolt and nuts 40, 41, extending through the plates 38, 39. The bias of the spring is adjusted by adjusting the nut and bolt. A source of string 42 is positioned in a covered receptacle 43 secured to the base 11 and is threaded into the holding member 37 where it is held until needed. A string cutting member 44 comprised of a knife 45 is disposed in the front wall 22 for severing the string.

As further seen in FIGS. 1, 2 and 3, the base is provided with two angularly disposed members 46, 47 secured to the inside of the upright members 16 and act as a storage adjunct for the table.

In use, the table is moved to the site where it is to be used and the string 42 is drawn from the holder 37 and laid across the table. The worker then grasps the sticks S with the tobacco stalks TS, thereon as shown in FIG. 1 and places the stick transversely with respect to the work surface 21 with the free end extending through one of the rear wall slots 25 and the stalks laying parallel to the work surface 21 and thereafter exerts a slight pull on the stick S, whereby the same is freed from the stalks TS, which engage the front wall 22. The stalks remain on the work surface 21 and the worker places the stick in the cradle support formed by the angled members 46, 47. This operation is repeated until a sufficient amount of stalks are gathered and the same are thereafter tied by using the string 42, and severing the same by cutting it on the knife 45. The worker then grasps the handle 33 and tilts the surface 21 forwardly or rearwardly to discharge the bunch onto the floor, ground, pallet or the like.

The two slots 25, 25 are provided to accommodate both a left-handed or right-handed worker as the case may be.

While the operation has been explained with the worker being positioned in front of the front wall 22, it is obvious that the same can be operated by the worker positioned in front of the rear vertical wall 23.

Additionally, the table can be made of any material desired, although wood is preferred, and can be made of any desired dimensions to accomplish the end results as disclosed hereinabove.

What is claimed is:

1. A work table comprising a base means, said base means being mounted on skid means to facilitate the movement thereof, a work surface supported on said base means, oppositely disposed vertical walls positioned on the work surface cradling material therein, slot type openings provided in one of the vertical walls accommodating support sticks therein transversely to said work surface, said sticks supporting said material on said work surface prior to the removal of the sticks, pivot means removably securing said work surface to said base means permitting the tilting of the work surface in either of two directions with respect thereto by disposing the pivot means in either of two positions with said work surface being movable to a substantially vertical position whereby the material can be discharged therefrom, handle means on one of said walls facilitating the tilting of the work surface, said pivot means being comprised of openings in said base means aligned with openings provided on the work surface with pins extending therethrough, limiting means removably positioned between the base means and work surface limiting the movement of the work surface to either of the vertical positions, an angled support extending outwardly from said base means receiving said sticks after the material is removed therefrom, a string receptacle means mounted on said base means housing a supply of string, and a string retaining means mounted on one of said walls and a cutter mounted within the other wall for cutting said string, whereby the string is threaded from said supply means through said retention means onto said surface and thereafter placed against said knife surface for severing purposes after the material has been bunched and tied.

2. The worktable of claim 1 wherein light means are mounted on one of the vertical walls between the slots thereof.

3. The invention of claim 1 wherein the wall opposite the wall with slots is provided with a large cutout to permit a workman to place sticks with supporting material therethrough onto the work surface.

* * * * *